Patented Feb. 7, 1939

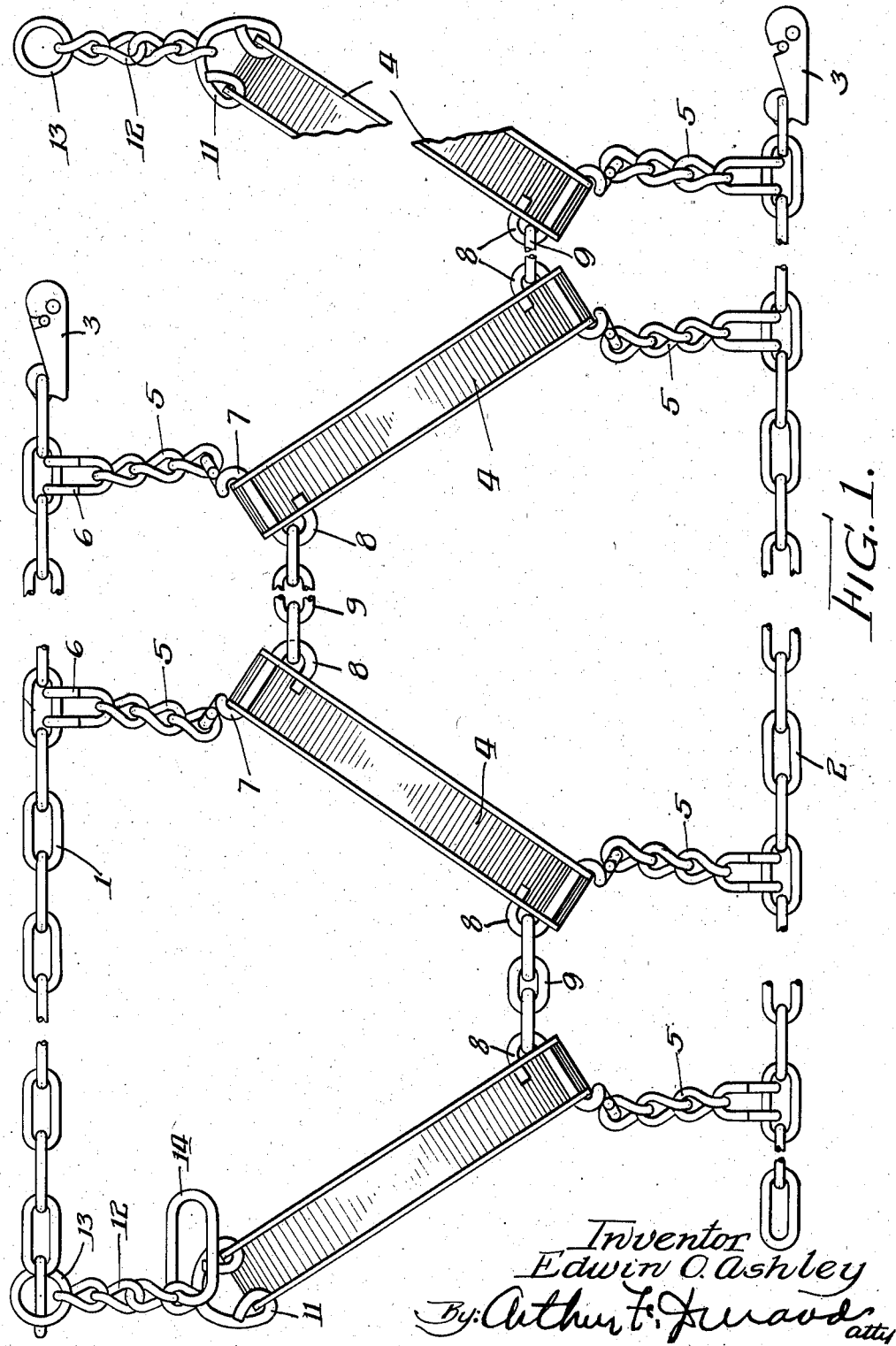

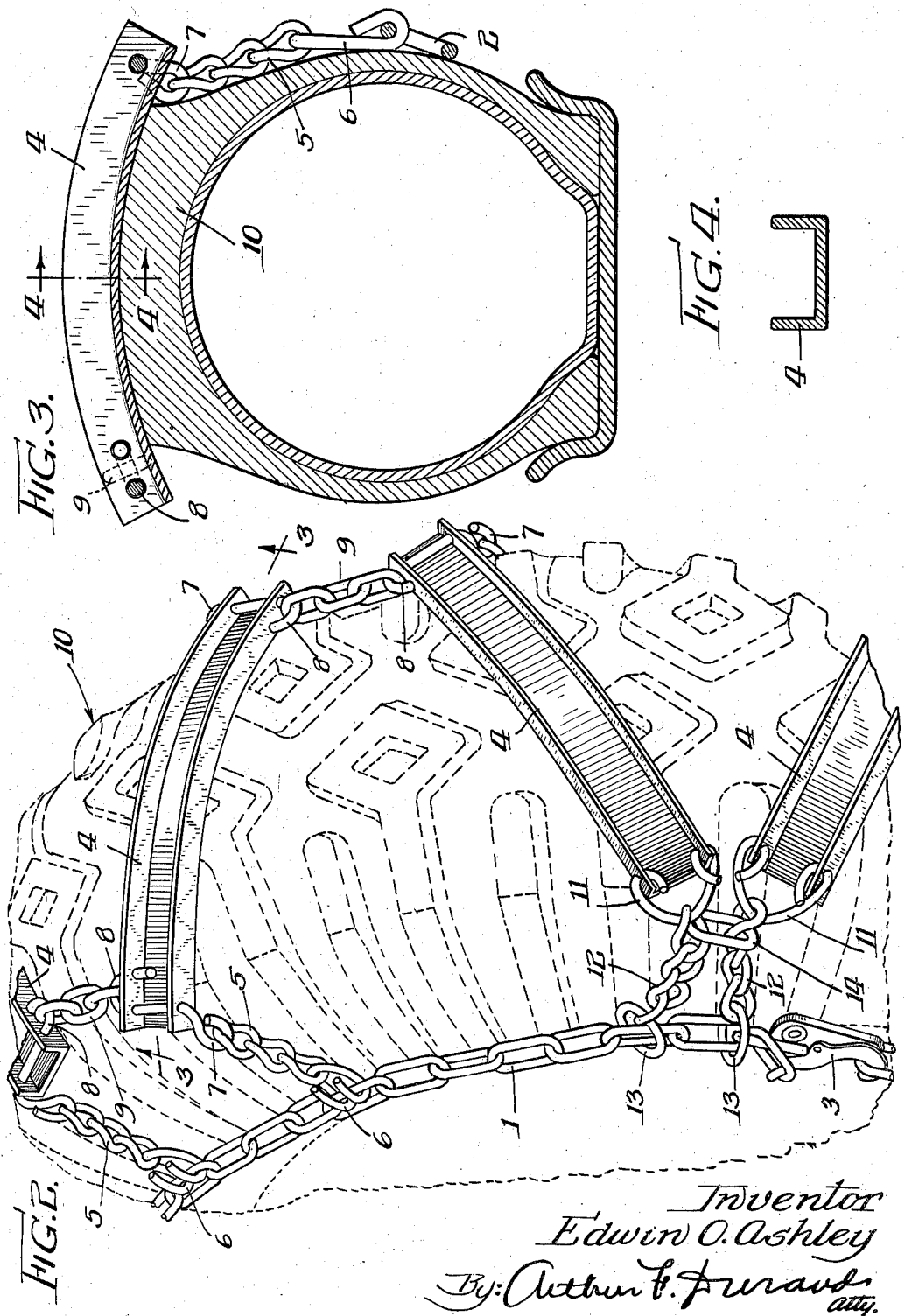

2,146,364

UNITED STATES PATENT OFFICE 2,146,364

TRACTION CHAIN

Edwin O. Ashley, Riverside, Mich., assignor to Kaywood Corporation, Benton Harbor, Mich., a corporation of Michigan Application April 30, 1937, Serial No. 139,869

5 Claims. (Cl. 152—228)

This invention relates to motor vehicle tire chains, and more particularly to those that are adapted for use on the heavy pneumatic tires employed on tractors.

Generally stated, the object of the invention is to provide a novel and improved construction and arrangement whereby a tire chain for this purpose is provided with ground-engaging traction lugs that are disposed obliquely or at an angle, across the tread of the tire, in such a manner that the chain attachment not only provides satisfactory traction while the vehicle is in operation on the bare ground, but also insures a smoother travel of the vehicle on a hard pavement.

It is also an object to provide certain details and features of construction tending to increase the general efficiency and desirability of a traction tire chain attachment of this particular character.

To the foregoing and other useful ends, the invention consists in matters hereinafter set forth and claimed and shown in the accompanying drawings, in which—

Fig. 1 is a plan view of a section of a chain attachment embodying the principles of the invention.

Fig. 2 is a perspective of the same, shown in use on the pneumatic tire of a tractor.

Fig. 3 is a transverse section of the tire and the traction chain attachment on line 3—3 in Fig. 2 of the drawings.

Fig. 4 is a detail transverse section of one of the metal lugs on line 4—4 in Fig. 3 of the drawings.

As thus illustrated, the invention comprises a pair of chains 1 and 2, that form the side members of the attachment, as these two chains are spaced apart at opposite sides of the tread of the tire, as shown in Fig. 2 of the drawings, and the opposite ends of each chain are then hooked together, thus fastening the chain attachment upon the tread of the pneumatic tire. Any suitable means, such as the connecting hooks 3, can be employed for connecting the opposite ends of each chain together, with the proper degree of tightness or tension, in order to hold the attachment in place.

The ground-engaging traction lugs 4 are of metal, like the chains, and are each preferably channel-shaped, on their outer sides, as shown in Fig. 4 of the drawings. It will be seen that the alternate lugs extend obliquely at one angle, while the intermediate lugs extend obliquely at the opposite angle, whereby there are alternate pairs of adjacent lug ends at one side of the tread of the tire, and intermediate pairs at the other side of the tire tread. The pairs of adjacent ends at one side are connected to the chain 1, by relatively short chains 5, which have hooks 6 at one end for engaging the chain 1, and which are connected at their other ends to the hooks 7 that extend through the side walls of the lugs 4, and then back a distance through one wall of the same, in order to provide eyes 8 for the connecting chains 9 by which the two adjacent lug ends are flexibly connected together. It will be seen that the same connections are provided between the pairs of adjacent lug ends and the chain 2, at the other side of the tread of the tire. Preferably, as shown, the lugs 4 are curved to fit the tread 10 of the tire, as shown in Fig. 3 of the drawings. The lugs 4, that are at the opposite ends of the chain attachment, have their ends provided with chain eyes 11, to which are attached the relatively short chains 12, that have their outer ends provided with rings 13, as shown. It will also be seen that the lug at one end of the attachment is provided with a link 14 inserted through one link of the chain 12, and that this link 14 is large enough to have the other chain 12 and its ring 13 inserted therethrough, as shown in Fig. 2 of the drawings, when the two ends of the chain structure or attachment are brought around and coupled together on the tread of the tire. Portions of the chain 1 pass through the rings 13, when the attachment is coupled together at its opposite ends, as shown in Fig. 2 of the drawings.

With the construction thus shown and described, which is illustrative of one form of the invention, the lugs 4 are not only effective for traction purposes, upon bare ground, but it is also true that, because of the angularity of these lugs, the tires are capable of rolling more smoothly on a hard pavement. This is because each lug 4 has, in effect, a progressive rolling or traveling contact with the pavement, and because the break in the continuity of this contact, between adjacent ends of the lugs, is relatively short. In this way, the traction lugs 4 travel or roll almost continuously on the pavement, which insures a smoother travel of the vehicle on a hard pavement, instead of with the jolting and bumping effect that would result with lugs placed transversely and at right angles to the tread of the tire. With the construction described, each lug practically comes down and engages the pavement at one end thereof, and then, in effect, rolls forward until it leaves the pavement at its other end, and as the distance between the adjacent ends of the lugs is comparatively short, it follows that the chain attachment thus constructed, in effect, rolls comparatively smoothly on a hard pavement, while at the same time it affords adequate traction on bare ground.

It will be seen that the connections 5, 8 and 9 are in the nature of loops, the two ends of which are secured to the flexible side members 1 and 2, with the loops at one side in staggered relation to the loops at the other side, as shown in Fig. 1 of the drawings. For this purpose, two of the links of each loop are formed to provide the hooks 7 and 8 that extend through the flanges of the lugs 4, in the manner shown, so that the converging ends of each pair of lugs are connected together and to one of the side members by one of said loops. Thus, the oblique arrangement of the lugs on the tread of the wheel is insured. Preferably, as shown, the said lugs are each of the same depth, the channel thereof, from end to end, and the opposite ends of each lug are cut off square. In this way, the lugs can be made, obviously, by merely subdividing a channel iron into lengths suitable for the lugs, and the latter can then be bent or curved.

Thus, with the construction shown and described, which is illustrative of the invention, the traction members 4, ordinarily called lugs, are each disposed obliquely upon the wheel tread, with the alternate members disposed at one angle, and the intermediate members at the opposite angle, and each continuous chain formed by the elements 5, 6, 7, 8, and 9 has its opposite ends attached to a side member, one or two, and has its middle portion threaded through the converging ends of the pair of lugs or traction members, and the latter are preferably rigid from end to end, and the opposite ends of each lug preferably project laterally a distance at opposite sides of the wheel or tire tread. Also each channel lug or member preferably has the same curve from end to end, and each end of the channel is open and overhangs the side of the tread, so that nowhere do these channel members engage the sides of the tire.

What I claim as my invention is:

1. In combination with a wheel tread, an attachment therefor comprising a plurality of traction members arranged upon and transversely of the tread, with alternate members disposed obliquely at one angle, and with intermediate members disposed obliquely at the opposite angle, side members, and a continuous chain loop for each pair of converging ends of said traction members, each chain having its opposite ends spaced apart and attached to a side member at spaced points on the latter, and having its middle portion threaded through said converging ends, preventing the chain from extending upon the face of the tread, and so that said chains extend continuously through said traction members.

2. A structure as specified in claim 1, each traction member consisting of a single rigid length of curved channel metal, with the channel thereof facing outwardly, and each loop passing through holes in the sides of the channel.

3. A structure as specified in claim 1, each loop being formed in part by two hook links inserted through the traction member, with one tip of each link hereof inserted back in the side of the traction member.

4. A structure as specified in claim 1, there being one pair of converging ends that are differently connected together to permit the removal of the traction attachment from the wheel.

5. In combination with a tire tread, flexible side members at opposite sides of the tire, flexible chains each having the opposite ends thereof spaced apart upon and fastened to a side member, at each side of the tire, forming a plurality of loops at one side in staggered relation to those at the other side, and spaced traction means connecting the loops at one side to those at the other side, while preventing said loops from extending upon the face of the tread, the width of each loop being substantially less than the maximum space in said traction means.

EDWIN O. ASHLEY.